(12) United States Patent
Louis

(10) Patent No.: US 10,012,305 B2
(45) Date of Patent: Jul. 3, 2018

(54) POWER TRANSMISSION GEARBOX AND AN AIRCRAFT

(71) Applicant: AIRBUS HELICOPTERS, Marignane (FR)

(72) Inventor: Charles Louis, Aix en Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 250 days.

(21) Appl. No.: 15/173,879

(22) Filed: Jun. 6, 2016

(65) Prior Publication Data

US 2016/0363208 A1 Dec. 15, 2016

(30) Foreign Application Priority Data

Jun. 11, 2015 (FR) ..................................... 15 01213

(51) Int. Cl.
*F16H 57/04* (2010.01)
*B64D 35/02* (2006.01)
*B64D 35/00* (2006.01)
*F16N 7/40* (2006.01)

(52) U.S. Cl.
CPC ........... *F16H 57/046* (2013.01); *B64D 35/00* (2013.01); *B64D 35/02* (2013.01); *F16H 57/0435* (2013.01); *F16H 57/0442* (2013.01); *F16N 7/40* (2013.01); *F16N 2260/24* (2013.01); *F16N 2260/50* (2013.01)

(58) Field of Classification Search
CPC combination set(s) only.
See application file for complete search history.

(56) References Cited

U.S. PATENT DOCUMENTS

| 4,717,000 A | 1/1988 | Waddington et al. |
| 4,976,335 A | 12/1990 | Cappellato |
| 5,046,306 A | 9/1991 | Borre, Jr. |
| 5,121,815 A | 6/1992 | Francois et al. |

(Continued)

FOREIGN PATENT DOCUMENTS

| EP | 0443901 | 8/1991 |
| EP | 0540406 | 5/1993 |

(Continued)

OTHER PUBLICATIONS

French Search Report for French Application No. FR 1501213, Completed by the French Patent Office on Apr. 12, 2016, 6 Pages.

(Continued)

*Primary Examiner* — William E Dondero
*Assistant Examiner* — Robert T Reese
(74) *Attorney, Agent, or Firm* — Brooks Kushman P.C.

(57) ABSTRACT

A power transmission gearbox provided with at least one lubrication system including a lubrication pump. The lubrication pump is in fluid flow communication with a fluid flow circuit leading to at least one spray means. The gearbox includes an emergency tank suitable for containing a lubrication fluid, the emergency tank being in fluid flow communication with the fluid flow circuit, the emergency tank being connected by at least one pipe to the fluid flow circuit upstream from each spray means, the lubrication fluid being moved in the fluid flow circuit to each spray means by a gas that is set into motion by the lubrication pump in the event of a leak of the lubrication liquid.

17 Claims, 2 Drawing Sheets

(56) References Cited

U.S. PATENT DOCUMENTS

| | | | |
|---|---|---|---|
| 5,344,101 A | 9/1994 | Francois | |
| 7,500,542 B2 | 3/2009 | Maret et al. | |
| 2007/0261922 A1 | 11/2007 | Mullen et al. | |
| 2012/0222761 A1* | 9/2012 | Poster | F16H 57/0456 137/563 |
| 2014/0090930 A1 | 4/2014 | James | |
| 2017/0175875 A1* | 6/2017 | Lapeyre | F16H 57/02 |

FOREIGN PATENT DOCUMENTS

| | | |
|---|---|---|
| FR | 2826094 | 12/2002 |
| WO | 9105943 | 5/1991 |
| WO | 2011059450 | 5/2011 |

OTHER PUBLICATIONS

Korean Notice of Preliminary Rejection dated Nov. 8, 2017, Application No. 10-2016-0072625, Applicant Airbus Helicopters, 3 Pages.

* cited by examiner

POWER TRANSMISSION GEARBOX AND AN AIRCRAFT

CROSS REFERENCE TO RELATED APPLICATION

This application claims priority to French patent application No. FR 15 01213 filed on Jun. 11, 2015, the disclosure of which is incorporated in its entirety by reference herein.

BACKGROUND OF THE INVENTION (1) Field of the Invention

The present invention relates to a power transmission gearbox, and also to an aircraft provided with such a gearbox.

In particular, an aircraft of the rotorcraft type has a rotor that contributes to providing the aircraft with at least part of its lift. A rotorcraft of the helicopter type may thus have a "main" rotor for providing it with lift and with propulsion.

(2) Description of Related Art

In order to set such a rotor into rotation, a rotorcraft is provided with a power plant including at least one engine.

In addition, a gearbox may be interposed between the engines and a rotor in order to transmit the power developed by the engines to the rotor. A particular function of the gearbox is to drive the rotor at a speed of rotation that is low compared with the high speed of rotation of the engines. By way of illustration, a turboshaft type engine has a drive shaft that rotates at a speed of the order of several tens of thousands of revolutions per minute, while the rotor rotates at a speed of only about 300 revolutions per minute.

Thus, a helicopter is provided with at least one engine that drives at least one main rotor via a main gearbox.

A prior art gearbox presents one mechanical drive system for each engine. Each inlet mechanical drive system is thus driven by a respective engine.

Furthermore, the inlet mechanical drive system acts together to drive a wheel, sometimes referred to as the "big" wheel.

The big wheel drives at least one speed reduction stage in order to drive rotation of the rotor via gearing.

The sets of gears present in helicopter main gearboxes need to be lubricated permanently, possibly in degraded manner as a result of certain failures.

Under such circumstances, a gearbox has a main lubrication system. Such a main lubrication system has a lubrication pump. For example, the big wheel may be constrained to rotate with a wheel that drives the lubrication pump.

The lubrication pump then transfers a lubrication liquid from a bottom of the gearbox to main spray means. The main spray means may comprise nozzles, for example.

The lubrication liquid drawn from the bottom of the gearbox is usually hot. Consequently, a lubrication system may include a heat exchanger arranged downstream from the main spray means in order to cool the lubrication liquid.

An emergency lubrication pump is sometimes arranged in the bottom of the gearbox in order to feed the main spray means, possibly without passing via the heat exchanger. The emergency lubrication pump operates continuously or it is put into operation automatically following a failure of the pump of the main lubrication system, for example.

In the event of a leak of the cooling liquid, regulations in force also require the gearbox to remain mechanically sound for a certain minimum duration in order to enable a crew to attempt to land the aircraft as quickly as possible.

Certain present technical solutions thus consist in providing an additional lubrication system in order to satisfy this requirement. Such an additional system may comprise an additional tank of lubrication liquid and an additional pump enabling the lubrication liquid to be caused to flow in the ducts provided with spray means that are dedicated to this additional system.

Such an additional system is found to be effective, but it presents numerous additional pieces of equipment, not only a pump, but also a tank and spray means. The additional system may be heavy and difficult to arrange in an environment that is encumbered by numerous members.

In this context, EP 0 540 406 describes an additional cooling system of this type.

The additional system includes an inlet orifice and an outlet orifice, which are arranged in a gearbox casing. The inlet orifice and the outlet orifice are opened under the action of a control device as from a predetermined value of a parameter that is representative of a loss of lubrication oil.

An air pipe leads to the inlet orifice in order to convey air. The air pipe may run from an air intake of the aircraft or from a compressor of an engine.

In addition, a supply of lubricant external to the gearbox is provided in order to lead into the air pipe. The supply of lubricant is thus connected to a feed tube that is arranged substantially at the center of the air pipe.

The supply of lubricant is arranged under the air pipe.

Document EP 0 448 690 describes an emergency lubrication system for use in the event of a failure of a primary lubrication system.

That emergency lubrication system comprises an oil tank that is filled from the primary lubrication system. Furthermore, the emergency lubrication system has a dedicated oil sprayer and a source of air that is external to the gearbox. The source of air may comprise air bled from an engine or indeed an auxiliary air compressor.

Document U.S. Pat. No. 4,717,000 describes an emergency lubrication system. That emergency lubrication system has an emergency tank that is normally fed from a primary lubrication system.

The emergency lubrication system includes a source of compressed air in the form of a compressor of an engine external to the gearbox, a valve that is sensitive to oil pressure, and mist generators dedicated to the emergency lubrication system.

Documents EP 0 443 901, US 2007/261922, U.S. Pat. No. 5,046,306, FR 2 826 094, U.S. Pat. No. 4,976,335, US 2014/090930, and WO 2011/059450 are also known.

BRIEF SUMMARY OF THE INVENTION

An object of the present invention is thus to propose an alternative system possibly tending to present limited bulk and/or weight.

In the invention, a power transmission gearbox is provided with at least one lubrication system, the lubrication system including a lubrication pump that is arranged in a sump containing a lubrication liquid, the lubrication pump being in fluid flow communication with a fluid flow circuit leading to at least one spray means directed towards an internal space of a casing of said gearbox, the lubrication liquid being drawn from the sump by the lubrication pump in order to flow in the fluid flow circuit and be sprayed into the internal space by each spray means.

For example, the sump is represented by a bottom of the gearbox casing. Spray means may be in the form of a nozzle or even an orifice.

Furthermore, the gearbox includes an emergency tank suitable for containing a lubrication fluid, the tank being in fluid flow communication with the fluid flow circuit, the emergency tank being connected by at least one pipe to the fluid flow circuit upstream from each spray means, said lubrication fluid being moved in the fluid flow circuit to each spray means by a gas that is set into motion by said lubrication pump in the event of a leak of said lubrication liquid.

The invention thus proposes adding to an existing lubrication system an emergency tank that is connected by at least one pipe to a fluid flow circuit. Such an emergency tank may be independent of the sump containing the lubrication liquid and it may be arranged outside the gearbox casing.

The lubrication pump of a gearbox continues to operate in the absence of lubrication liquid. The Applicant notes that the lubrication pump can then transform itself into an air compressor in this configuration.

Under such circumstances, the lubrication pump sets a gas such as air into motion in the fluid flow circuit, instead of the lubrication liquid. The emergency tank also delivers a lubrication fluid into the fluid flow circuit. A mixture of this gas and this lubrication fluid is then directed towards the spray means. The spray means then spray the lubrication fluid, e.g. in the form of a mist.

The invention goes against prejudice by running the lubrication pump when empty, i.e. in the absence of the lubrication liquid for which the lubrication pump is initially provided. The lubrication pump then becomes transformed into an air compressor.

Furthermore, the transfer of the lubrication fluid into the fluid flow circuit may take place at a low flow rate. The gas under pressure driven by the lubrication pump is then present in the fluid flow circuit in greater quantity than the lubrication fluid. Consequently, spray means of standard nozzle type can become transformed into mist generators.

This operation is not obvious in any way. In the absence of the lubrication liquid, the lubrication pump tends to become heated. Nevertheless, the lubrication pump can still continue to operate for some minimum length of time. The oily mist generated by the lubrication system from the lubrication fluid serves to cool moving parts in the gearbox, and possibly also the lubrication pump.

Furthermore, a lubrication pump designed to cause a fluid to circulate has limited influence on a gas. Nevertheless, the Applicant notes that the small increase in gas pressure present in the gearbox is sufficient to spray the lubrication fluid.

Under such circumstances, and in contrast to some of the prior art, the invention does not require the use of a new pressure source, e.g. a compressor of an engine. The lubrication pump specifically of a gearbox lubrication system is used in an emergency mode of operation for spraying an emergency lubrication fluid.

The invention can thus be adapted relatively easily to an existing lubrication system.

The gearbox may also include one or more of the following characteristics.

Thus, the gearbox may include two lubrication systems. Each lubrication system then includes a respective emergency tank of the invention, for safety purposes.

Furthermore, said emergency tank may be located above said fluid flow circuit.

In this configuration, the lubrication fluid may in particular escape from the emergency tank and flow to the fluid flow circuit under gravity.

This configuration may tend to optimize the formation of a mist of lubricant with the lubrication fluid. The lubrication fluid can drop in the form of drops that "burst" against a wall of the fluid flow circuit, which can tend to encourage mixing of the lubrication fluid with the gas set into motion by the lubrication pump.

Furthermore, the emergency tank may include a movable divider dividing the tank into a pressurized volume that does not receive a lubrication fluid and a volume that receives the lubrication fluid.

The emergency tank then has a pressurized volume that maintains the lubrication means at a predetermined pressure.

Furthermore, in the absence of a leak of the lubrication liquid, the lubrication pump may pressurize the lubrication liquid to a pressure greater than or equal to 1.5 bars, the lubrication pump entraining said gas in the fluid flow circuit at a pressure of 1.05 bars following a leak of the lubrication liquid.

Such a lubrication pump can thus enable the lubrication liquid to flow under normal conditions of operation, and can cause a gas to flow in the event of a leak of the lubrication liquid.

In addition, said emergency tank may be connected to the fluid flow circuit by at least one pipe referred to as "outlet" pipe that leads to a duct of the fluid flow circuit.

This outlet pipe directs the lubrication fluid to the fluid flow circuit, where appropriate under the effect of gravity.

The outlet pipe may be dimensioned in such a manner as to generate a flow of lubrication fluid in the form of drops. For example, the outlet pipe may include a constriction serving in particular to allow the lubrication fluid to flow in drop-by-drop form.

Optionally, at least one outlet pipe has an end provided with a convergent nozzle that is arranged within a duct of the fluid flow circuit.

This lubrication fluid then escapes from the outlet pipe by a Venturi effect. In order to encourage this escape, the convergent nozzle may be arranged in the middle of the duct of the fluid flow circuit.

In a first embodiment, the emergency tank is filled by the fluid flow circuit in the absence of a leak of the lubrication liquid, the fraction of the lubrication liquid that fills the emergency tank representing the lubrication fluid.

The emergency tank presents a retention zone retaining only a fraction of the lubrication liquid. The lubrication system is then simplified.

When the gearbox is put into operation, the lubrication liquid fills the emergency tank.

The lubrication liquid is then discharged by gravity from the emergency tank in the event of a leak from the lubrication system, or indeed in the event of the gearbox stopping. Optionally, the lubrication liquid may escape continuously from the emergency tank, even though it is useful only in the event of a leak.

In one option, a single pipe can be used both to fill the emergency tank in the absence of a leak and to empty the emergency tank in the presence of a leak.

Alternatively, said emergency tank is connected to the fluid flow circuit by at least one pipe referred to as "inlet" pipe, said inlet pipe being a one-way connection enabling a fluid to flow solely from the fluid flow circuit towards the emergency tank. The inlet pipe may include a check valve to allow a fluid to flow solely from the fluid flow circuit towards the emergency tank.

An inlet pipe enables the emergency tank to be filled, and an outlet pipe enables it to be emptied.

Furthermore, and in a variant, said emergency tank is connected to the fluid flow circuit by an "inlet" pipe in order to be filled by the fluid flow circuit in the absence of a leak of the lubrication liquid, said emergency tank being connected to the fluid flow circuit by an outlet pipe in order to transfer a lubrication fluid to the fluid flow circuit, said outlet pipe presenting a minimum diameter that is smaller than a minimum diameter of the inlet pipe.

The term "minimum diameter" refers to the smallest diameter of a pipe.

This configuration seeks to obtain an outlet pipe of small diameter so as to generate a flow of the lubrication fluid in drop-by-drop form and/or so as to encourage filling of the emergency tank.

In a second embodiment, said emergency tank is connected to the fluid flow circuit solely by an outlet pipe, the lubrication fluid being distinct from the lubrication liquid.

In this second embodiment, the emergency tank is dedicated to emergency lubrication so as to be used only in the event of a leak.

This emergency tank can thus be filled by an operator.

This second embodiment presents the advantage of making it possible to use a lubrication fluid that is different from the lubrication liquid. For example, the lubrication fluid and the lubrication liquid may comprise respective oils presenting different characteristics. Thus, the lubrication fluid may be an oil that is better adapted to mist generation and/or more effective at high temperature than the lubrication liquid.

Furthermore, said emergency tank may be connected to the fluid flow circuit by a pipe provided with a valve.

The valve enables the emergency tank and the fluid flow circuit to be put into fluid flow communication only in the event of a leak.

Such a valve may be controlled by a manual control operable by a pilot.

In alternative or additional manner, the valve is connected to at least one pressure sensor measuring a pressure in said fluid flow circuit. The valve then opens when the moving members for lubricating in the gearbox are in motion and the pressure drops below a pressure threshold.

For example, the valve is also connected for this purpose to a device measuring the speed of rotation of one of the moving members, or indeed the speed of rotation of a rotor driven by the gearbox.

In alternative or additional manner, the valve is connected to at least one temperature sensor measuring a temperature in the internal space of a gearbox casing, said valve opening when said temperature becomes higher than a temperature threshold.

In addition to a power transmission gearbox, the invention also provides an aircraft including such a gearbox.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which.

DETAILED DESCRIPTION OF THE INVENTION

Elements present in more than one of the figures are given the same references in each of them.

Figure 1:
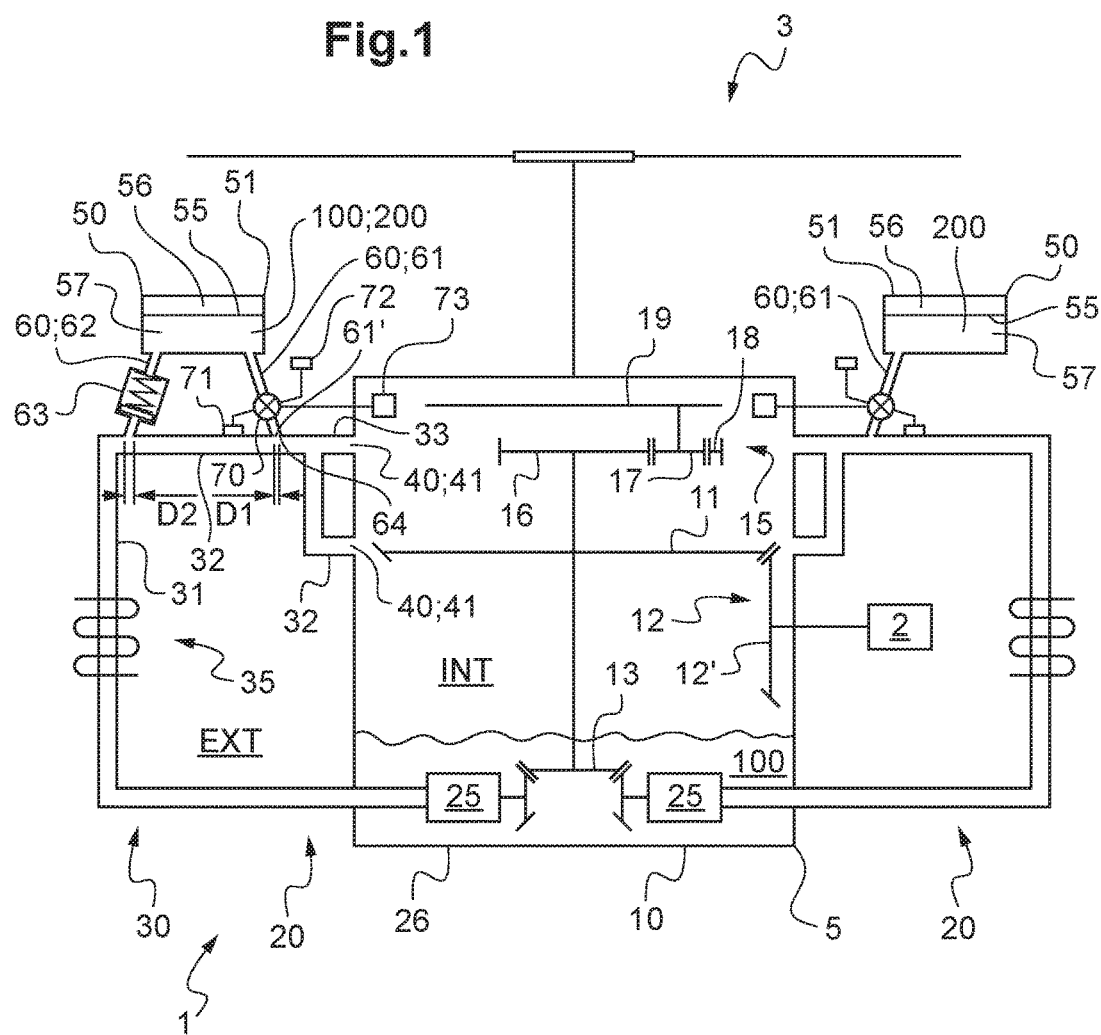
FIG. 1 is a diagram showing an aircraft of the invention, the aircraft including a power transmission gearbox.

FIG. 1 shows an aircraft 1 of the invention. The aircraft 1 has a rotor 3. Such a rotor 3 may be a rotor that contributes at least in part to providing the aircraft 1 with lift and/or propulsion.

In order to set the rotor 3 into motion, the aircraft has at least one engine 2 and a power transmission gearbox 5.

Under such circumstances, the gearbox 5 comprises transmission members that rotate within a casing 10.

Thus, inside the casing 10, the gearbox 5 includes a drive wheel 11 setting at least one speed reduction stage 15 into motion. For example, the speed reduction stage 15 may have a sunwheel 16 constrained to rotate with the drive wheel 11 by a power transmission shaft. The sunwheel 16 meshes with at least one planet wheel 17 that slides along a peripheral ring 18. Each planet wheel 17 is also carried by a planet carrier 19. The planet carrier 19 may be mechanically connected to the rotor 3 for driving as shown in FIG. 1, or indeed it may be connected to another speed reduction stage.

The drive wheel 11 may also be driven indirectly in rotation about an axis of rotation by each engine. Thus, the gearbox may be provided with a respective mechanical inlet member 12 for each engine. Each mechanical inlet member 12 has at least one wheel 12' that meshes with the drive wheel 11.

Furthermore, the gearbox 5 has at least one lubrication system 20 for lubricating the movable members of the gearbox 5. Optionally, the gearbox 5 may be provided with two lubrication systems 20 that may be identical or different.

Each lubrication system 20 includes a lubrication pump 25. The lubrication pump 25 may be driven by a wheel 13, the wheel 13 optionally being constrained to rotate with the drive wheel 11.

Under such circumstances, the lubrication pump 25 draws lubrication liquid 100 from a sump 26 of the gearbox. Conventionally, the lubrication liquid may comprise oil. Reference may be made to the literature in order to obtain information about lubrication liquids.

The sump 26 may comprise the bottom of the casing 10 of the gearbox 5. Thus, a lubrication liquid injected into a internal space INT of the casing 10 drops into the sump 26 by gravity.

Furthermore, each lubrication system 20 includes a fluid flow communication 30 in fluid flow communication with the lubrication pump 25. The lubrication pump is thus dimensioned so as to cause the lubrication liquid to flow in the fluid flow circuit 30.

The fluid flow circuit leads to at least one spray means 40 directed towards the internal space INT of a casing. Each spray means 40 may comprise conventional means, such as an orifice 41 or a nozzle (not shown), by way of example.

The fluid flow circuit includes at least one duct 31, 32, 33. The term "duct" should be interpreted broadly, a duct possibly comprising a plurality of individual pieces of pipework connected end to end.

The fluid flow circuit may be virtually subdivided into an upstream duct 31 connected to the lubrication pump 25, a central duct 32 connected to the upstream duct 31, and a downstream duct 33 for each spray means 40. The upstream duct 31 may optionally co-operate with a heat exchanger 35.

In the absence of a leak of lubrication liquid, such as a leak from the sump 26, lubrication liquid 100 is drawn from the sump 26 by the lubrication pump 25. The lubrication liquid then flows in the fluid flow circuit 30 so as to end up being sprayed into the internal space INT by each spray means 40.

In order to lubricate this internal space following a leak of lubrication liquid 100, at least one, and possibly each, lubrication system 20 includes an additional emergency tank 50.

The emergency tank 50 of a lubrication system 20 is arranged in parallel with the fluid flow circuit of the lubrication system 20.

The emergency tank comprises a shell 51 containing a lubrication fluid 200. The lubrication fluid 200 may comprise oil.

The emergency tank 50 is independent of the sump 26. Consequently, the emergency tank represents a container that is distinct from the sump 26.

Furthermore, the emergency tank may be arranged outside the casing 10 that contains the rotary members of the gearbox.

This emergency tank 50 is then in fluid flow communication with the fluid flow circuit 30 upstream from the spray means 40, i.e. by way of example, upstream from the downstream duct 33. Under such circumstances, the emergency tank may be in fluid flow communication with the central duct 32.

For this purpose, the emergency tank 50 has at least one pipe 60 extending from the shell 51 to the fluid flow circuit 30.

FIG. 1 shows two emergency tanks 50, respectively in a first embodiment and in a second embodiment.

Whatever the embodiment, the emergency tank is thus connected by at least one outlet pipe 61 to the fluid flow circuit.

The outlet pipe serves in particular to enable the lubrication fluid 200 to reach the fluid flow circuit 30. To facilitate this movement, an emergency tank 50 may be located above the corresponding fluid flow circuit 30 in order to enable the lubrication fluid 200 to flow under gravity.

The outlet pipe 61 then leads to a duct of the fluid flow circuit, and in particular to the central duct as shown in FIG. 1.

In the variant of FIG. 1, an outlet pipe 61 has an orifice 61' opening out into the fluid flow circuit. Furthermore, the outlet pipe may include a constriction 64, in particular for encouraging flow of the drop-by-drop type.

Figure 2:
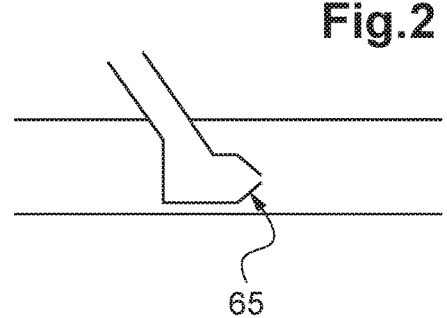
FIG. 2 is a diagram showing an outlet pipe including a convergent nozzle.

In the variant of FIG. 2, an outlet pipe has an end provided with a converging nozzle 65 that is arranged in the fluid flow circuit. For example, the converging nozzle 65 is arranged in the middle of a duct of the fluid flow circuit.

Furthermore, and with reference to FIG. 1, a pipe from an emergency tank may be fitted with a valve 70.

In particular, an outlet pipe 61 may include such a valve 70 to enable lubrication fluid to flow only under predetermined conditions.

A valve 70 may be controlled by a manual control 72 operable by a pilot.

In addition, a valve 70 may be controlled as a function of a pressure that exists in the fluid flow circuit. The valve 70 is then connected to at least one pressure sensor 71 measuring a pressure in the fluid flow circuit 30. Said valve 70 may optionally open when the measured pressure becomes lower than a pressure threshold.

A valve 70 may also be controlled by a temperature that exists in the internal space INT of the gearbox. The valve 70 is then connected to at least one temperature sensor 73 measuring a temperature in the internal space INT, said valve opening when said temperature becomes higher than a temperature threshold.

Furthermore, an emergency tank may include a divider 55. By way of example, such a divider 55 presents a piston or a diaphragm separating the emergency tank 50 into a pressurized volume 56 that does not contain lubrication fluid 200 and a lubricant volume 57 that contains the lubrication fluid 200. The pressurized volume 56 may, by way of example, contain a gas that is injected by an operator at a predetermined pressure.

The pressure that exists in the lubricant volume 57 is lower than the pressure of the lubrication liquid in the fluid flow circuit.

In a first embodiment illustrated by the lubrication system 20 shown on the left in FIG. 1, the emergency tank is filled by the fluid flow circuit 30.

In the absence of a leak of lubrication liquid, a fraction of the lubrication liquid fills the emergency tank. The lubrication fluid 200 thus represents a fraction of the lubrication liquid 100.

The outlet pipe can enable the lubrication liquid to be conveyed to the emergency tank in a first alternative that is not shown.

Nevertheless, in a second alternative as shown in FIG. 1, the emergency tank includes an "inlet" pipe 62 in order to enable it to be filled by the fluid flow circuit.

The inlet pipe 62 is situated upstream from the outlet pipe 61. The inlet pipe also extends from the fluid flow circuit and, in particular, from the central duct 32, to the shell 51 of the emergency tank 50.

This inlet pipe 62 may be a one-way connection enabling lubrication liquid to flow solely from the fluid flow circuit 30 to the emergency tank 50.

Consequently, the inlet pipe may include a check valve 63.

In addition, the inlet pipe 62 and the outlet pipe 61 may present different dimensions. The outlet pipe 61 thus presents a minimum diameter D1 that is less than a minimum diameter D2 of the inlet pipe 62.

Figure 3:
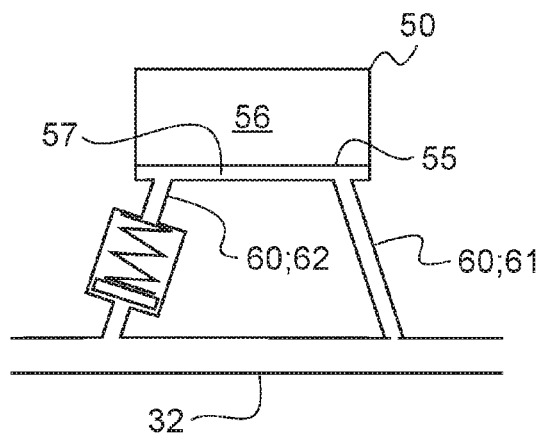
FIGS. 3 to 5 are diagrams explaining the operation of a lubrication system comprising a tank fed with fluid by the fluid flow circuit of the lubrication circuit.
Figure 4:
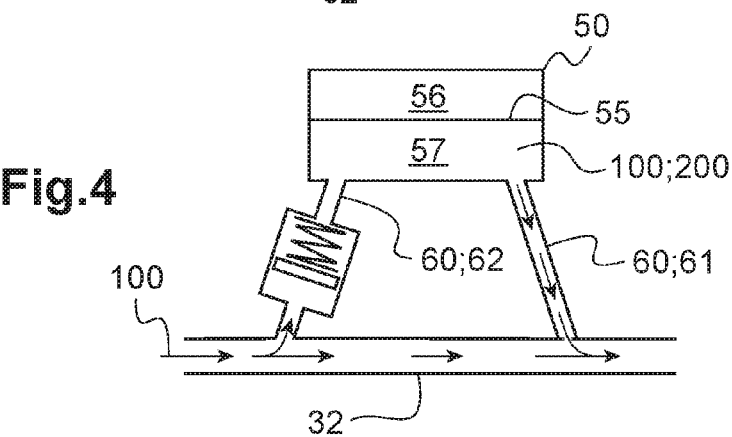
Figure 5:
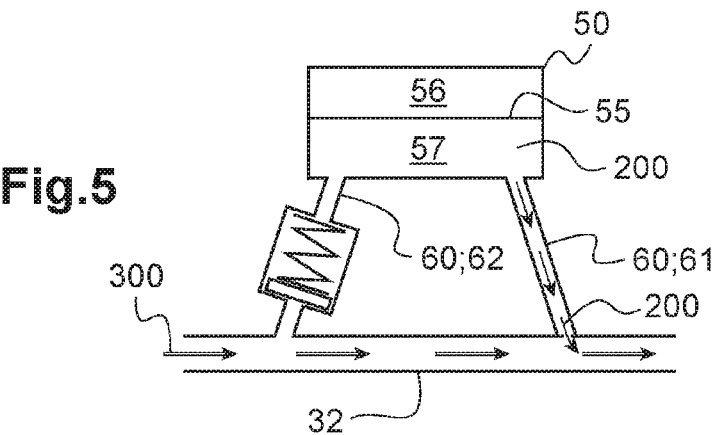

The emergency tank in the first embodiment shown in FIG. 1 has a valve 70. Nevertheless, such a valve is optional, and in particular it is shown in FIGS. 3 to 5.

In a second embodiment illustrated by the lubrication system 20 arranged on the right in FIG. 1, the emergency tank is not filled by the fluid flow circuit 30.

The emergency tank 50 is connected to the fluid flow circuit 30 solely by an outlet pipe 61.

Furthermore, the lubrication fluid 200 is distinct from the lubrication liquid 100. The term "is distinct from the lubrication liquid 100" means that the lubrication fluid is not a portion of the lubrication liquid. The lubrication fluid is introduced into the emergency tank 50 by an operator.

Nevertheless, the lubrication fluid and the lubrication liquid may be fluids that are different or identical.

The outlet pipe may be provided with a valve of the type described above.

Independently of the way the emergency tank is embodied, the lubrication system does not have a compressor external to the gearbox.

Specifically, in the event of a leak of lubrication liquid, the lubrication fluid 200 contained in an emergency tank is caused to move in the fluid flow circuit 30 towards each of the spray means 40 by a gas. In the event of a leak of the lubrication liquid, the sump 26 becomes filled with a gas, such as air. This gas is then set into motion by the lubrication pump 25 in the fluid flow circuit and it mixes with the lubrication fluid, in order to enable the lubrication fluid to be delivered into the internal space INT by the spray means 40.

The invention therefore does not need an additional air compressor.

FIGS. 3 to 5 show the operation of the invention with an emergency tank of the first embodiment.

With reference to FIG. 3, the emergency tank is empty prior to starting the gearbox.

With reference to FIG. 4, while the gearbox is set into motion by at least one engine, the lubrication pump is in operation.

This lubrication pump causes the lubrication liquid 100 to flow in the fluid flow circuit 30. The lubrication pump can then pressurize the lubrication liquid 100 in the fluid flow circuit to a pressure greater than or equal to 1.5 bars, where one bar is equal to 101,300 pascals (Pa).

When the lubrication liquid 100 reaches the central duct 32, a fraction of this lubrication liquid 100 passes along the inlet pipe 62 so as to reach the emergency tank 50.

Since the outlet pipe 61 has a minimum diameter that is less than the minimum diameter of the inlet pipe 62, a fraction of the lubrication liquid remains in the emergency tank so as to constitute a supply of lubrication fluid 200. Optionally, a valve may be arranged on the outlet pipe in order to enable the emergency tank to be filled.

The level of lubrication fluid thus rises in the emergency tank. The emergency tank therefore becomes filled passively.

When used, a divider 55 serves to define a gas pressurized volume 56 in the emergency tank in order to maintain the lubrication fluid under a predetermined pressure. For example, the lubrication fluid may be maintained at a pressure lying in the range 1.1 bars to 1.5 bars.

Optionally, a fraction of the lubrication fluid flows in the fluid flow circuit without having any influence on the operation of the fluid flow circuit.

When the gearbox is stopped, the lubrication fluid flows under gravity into the fluid flow circuit, with the emergency tank returning to the state shown in FIG. 3.

In the event of a leak of lubrication liquid, and with reference to FIG. 3, the lubrication pump causes a gas 300 to flow in the fluid flow circuit. This gas presents a pressure of less than 1.5 bars. In particular, the pressure of the gas is less than the pressure in the pressurized volume, e.g. reaching a pressure of about 1.05 bars.

In the variant of FIG. 5, the lubrication fluid flows under gravity into the outlet pipe 61, and then flows in drop-by-drop form in the fluid flow circuit.

In the variant of FIG. 2, the lubrication fluid escapes from the converging nozzle 65 by the Venturi effect.

The mixture of gas and lubrication fluid is then directed towards the spray means which produce a mist of lubrication fluid inside the casing of the gearbox.

Figure 6:
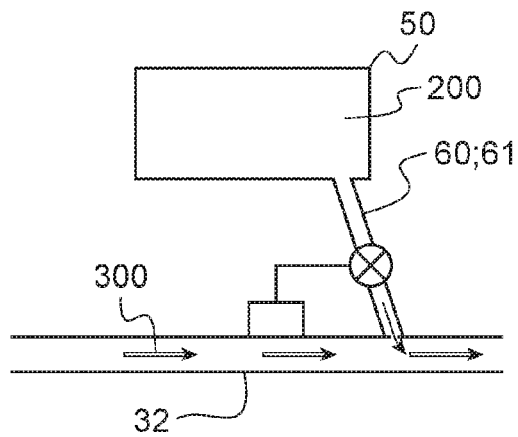
FIG. 6 is a diagram explaining the operation of a lubrication system comprising a tank having its own supply of fluid.

In the second embodiment shown in FIG. 6, in the presence of a leak of the lubrication liquid, the lubrication pump causes a gas 300 to flow in the fluid flow circuit.

In addition, the valve 70 opens. The lubrication fluid then flows under gravity along the outlet pipe 61 so as to be mixed with the gas 300.

Naturally, the present invention may be subjected to numerous variants as to its implementation. Although several embodiments are described, it will readily be understood that it is not conceivable to identify all possible embodiments. It is naturally possible to envisage replacing any of the means described by equivalent means without going beyond the ambit of the present invention.

What is claimed is:

1. A power transmission gearbox having at least one lubrication system, the lubrication system including a lubrication pump that is arranged in a sump containing a lubrication liquid, the lubrication pump being in fluid flow communication with a fluid flow circuit leading to at least one spray means directed towards an internal space of a casing of the gearbox, the lubrication liquid being drawn from the sump by the lubrication pump in order to flow in the fluid flow circuit and be sprayed into the internal space by each spray means, wherein the gearbox includes an emergency tank suitable for containing a lubrication fluid, the emergency tank being in fluid flow communication with the fluid flow circuit, the emergency tank being connected by at least one pipe to the fluid flow circuit upstream from each spray means, the lubrication fluid being moved in the fluid flow circuit to each spray means by a gas that is set into motion by the lubrication pump in the event of a leak of the lubrication liquid.

2. A gearbox according to claim 1, wherein the gearbox includes two lubrication systems.

3. A gearbox according to claim 1, wherein the emergency tank is located above the fluid flow circuit.

4. A gearbox according to claim 1, wherein the emergency tank includes a movable divider dividing the emergency tank into a pressurized volume that does not receive a lubrication fluid and a volume that receives the lubrication fluid.

5. A gearbox according to claim 1, wherein in the absence of a leak of the lubrication liquid, the lubrication pump pressurizes the lubrication liquid to a pressure greater than or equal to 1.5 bars, the lubrication pump entraining the gas in the fluid flow circuit at a pressure of 1.05 bars following a leak of the lubrication liquid.

6. A gearbox according to claim 1, wherein the emergency tank is connected to the fluid flow circuit by at least one pipe referred to as "outlet" pipe that leads to a duct of the fluid flow circuit.

7. A gearbox according to claim 1, wherein the emergency tank is connected to the fluid flow circuit by at least one pipe referred to as "outlet" pipe, the outlet pipe having an end provided with a converging nozzle that is arranged within a duct of the fluid flow circuit.

8. A gearbox according to claim 1, wherein the emergency tank is filled by the fluid flow circuit in the absence of a leak of the lubrication liquid, the fraction of the lubrication liquid that fills the emergency tank representing the lubrication fluid.

9. A gearbox according to claim 8, wherein the emergency tank is connected to the fluid flow circuit by at least one pipe referred to as "inlet" pipe, the inlet pipe being a one-way connection enabling a fluid to flow solely from the fluid flow circuit towards the emergency tank.

10. A gearbox according to claim 1, wherein the emergency tank is connected to the fluid flow circuit by a pipe referred to as "inlet" pipe in order to be filled by the fluid flow circuit in the absence of a leak of the lubrication liquid, the emergency tank being connected to the fluid flow circuit by an outlet pipe in order to transfer a lubrication fluid to the fluid flow circuit, the outlet pipe presenting a minimum diameter that is smaller than a minimum diameter of the inlet pipe.

11. A gearbox according to claim 7, wherein the emergency tank is connected to the fluid flow circuit solely by an outlet pipe, the lubrication fluid being distinct from the lubrication liquid.

12. A gearbox according to claim 1, wherein the emergency tank is connected to the fluid flow circuit by a pipe provided with a valve.

13. A gearbox according to claim 11, wherein the valve is controlled by a manual control operable by a pilot.

14. A gearbox according to claim 12, wherein the valve is connected to at least one pressure sensor measuring a pressure in the fluid flow circuit.

15. A gearbox according to claim 12, wherein the valve is connected to at least one temperature sensor measuring a temperature in the internal space, the valve opening when the temperature becomes higher than a temperature threshold.

16. A gearbox according to claim 1, wherein the emergency tank is independent of the sump and arranged outside the casing.

17. An aircraft, wherein the aircraft includes a power transmission gearbox according to claim 1.

* * * * *